United States Patent [19]

Hansen et al.

[11] 4,047,914

[45] Sept. 13, 1977

[54] INTERNALLY SUPPORTED MULTI-STAGE SLEEVE FILTER

[75] Inventors: Elwood F. Hansen, Allendale; Arnold Goldberg, Fair Lawn; Henry Zenzie, Princeton; Kermit Giroward, Scotch Plains, all of N.J.

[73] Assignee: Drico Industrial Corporation, Wallington, N.J.

[21] Appl. No.: 727,204

[22] Filed: Sept. 27, 1976

[51] Int. Cl.$^2$ .............................................. B01D 46/02
[52] U.S. Cl. ........................................ 55/488; 55/274; 55/492; 55/528; 210/508
[58] Field of Search ................. 55/274, 486, 487, 488, 55/489, 492, 527, 529, 379, 528; 210/506, 508

[56] References Cited

U.S. PATENT DOCUMENTS

| | | | |
|---|---|---|---|
| 2,493,257 | 1/1950 | Malme | 55/492 |
| 3,251,475 | 5/1966 | Till et al. | 55/527 |
| 3,494,113 | 2/1970 | Kinney | 55/486 |
| 3,877,909 | 4/1975 | Hansen | 55/487 |

Primary Examiner—Frank W. Lutter
Assistant Examiner—David L. Lacey
Attorney, Agent, or Firm—Burgess, Dinklage & Sprung

[57] ABSTRACT

A self-supporting, self-gasketing, multi-stage, variable density glass fiber sleeve filter is disclosed and includes a reusable internal wire frame with a composite, low velocity fluid entry filter member on one side of the frame and a fluid egress member on the other side of the frame. The fluid entry filter member is made of two or more layers of medium to long filament puffed glass fiber that differ in thickness and density. The entry and egress members are stitched along longitudinal edge portions so as to form an open ended sleeve that can be slid on and off of the reusable frame. The sleeve is dimensioned such that when it is slid onto the frame both the entry and egress members are tensioned across the frame such that the entry member is outwardly curved with respect to the egress member.

9 Claims, 5 Drawing Figures

U.S. Patent  Sept. 13, 1977  4,047,914
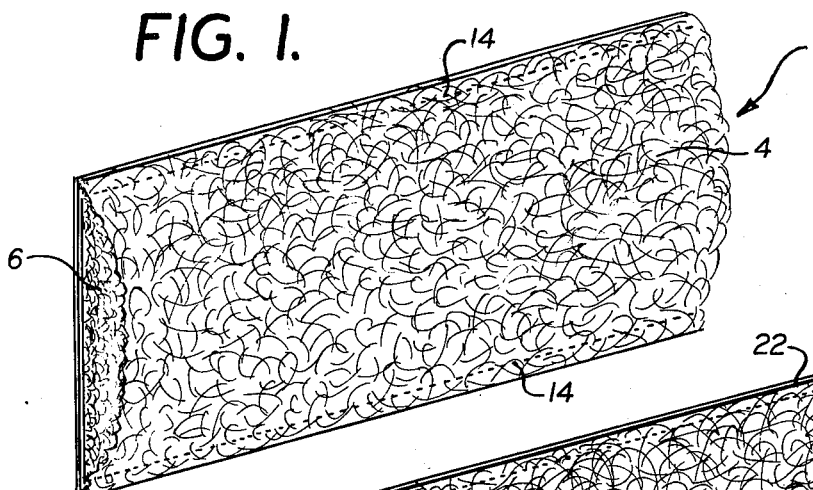
FIG. 1.
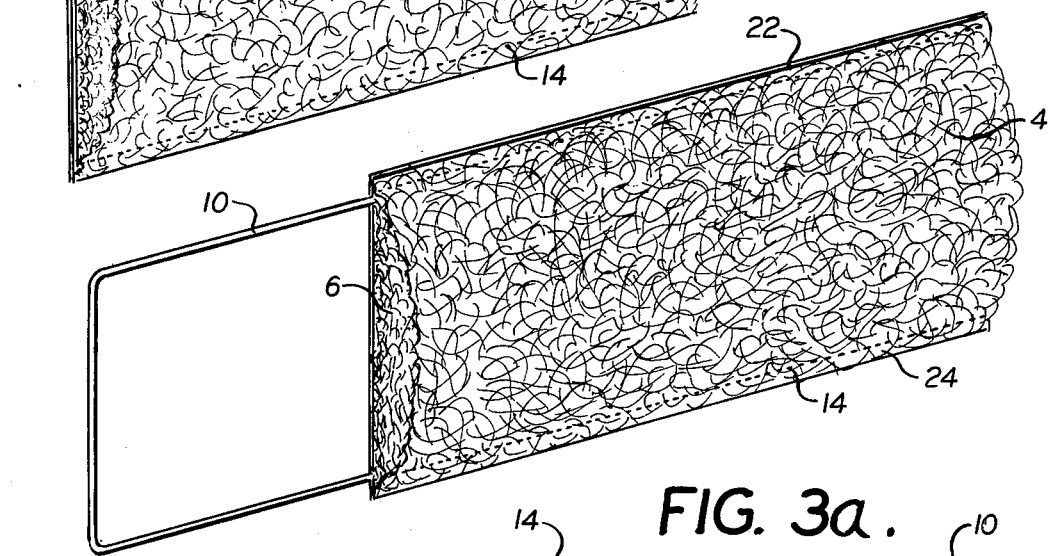
FIG. 2.
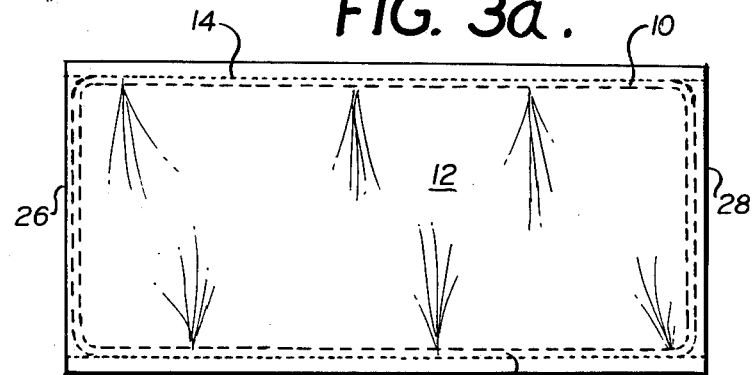
FIG. 3a.
FIG. 4.
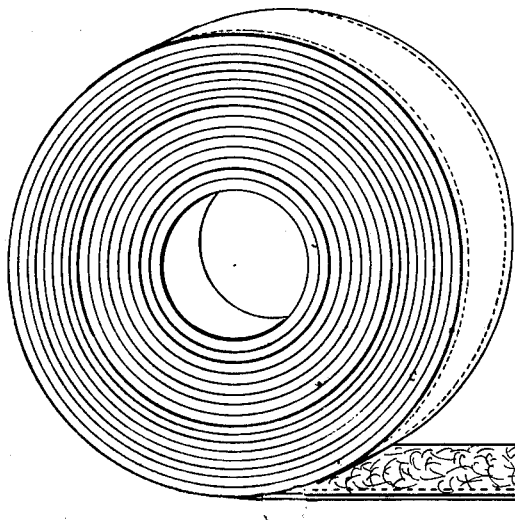
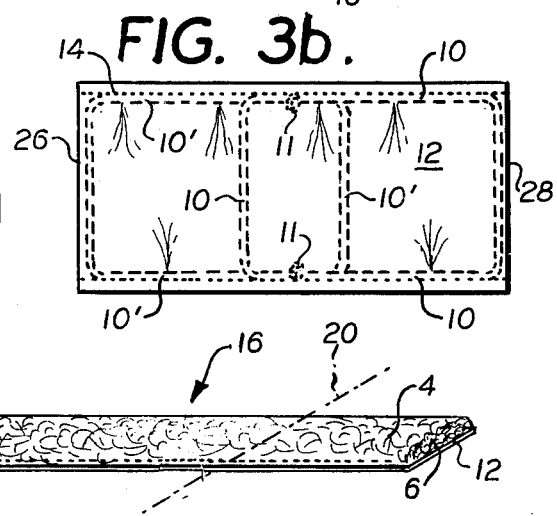
FIG. 3b.

INTERNALLY SUPPORTED MULTI-STAGE SLEEVE FILTER

BACKGROUND

This invention relates to an improved filter for use in air conditioners and other such devices through which air is passed and filtered. More especially the present invention relates to a sleeve filter having a plurality of filter layers on the upstream side of a supporting wire frame and a thin fibrous surfacing mat on the downstream side of the frame. The layers on the upstream side of the frame form a multi-stage fluid filter having a thickness substantially greater than the thickness of the surfacing mat on the downstream side. The upstream filter layers and the surfacing mat are tensioned across the frame to prevent bulging. The filter is self-gasketing to prevent by-pass and blow-out.

Filters for use in air conditioning and heating devices are known and include filters having a metal or cardboard frame extending about the edges of the filter and overlapping both the front and back panels of the filter. Some of these filters also have expanded metal grids or similar structures (such as bottle cap scrap) on one or both surfaces to support the filter. In some prior art filters, coarse screens have been embedded in the fibrous material for supporting the filter.

However, in all of these filters the support material considerably reduces the effective area of the filter, even up to 20% of the filtering area. Furthermore, when the edge type supported filter is used, particularly in devices where filters are abutted edge to edge, there results a gap or a space through which unfiltered air readily passes.

In U.S. Pat. Nos. 3,388,535 and 3,388,536, both to Nash, there are described self-supported filters each having two layers of fibrous filter material. Each patent describes a self-supporting structure as containing a self-supporting frame and centrally located supporting elements to prevent buckling between the two filter elements. The frame includes two portions, the first of which portions extends adjacent the entire periphery of both layers. The second portion is centrally disposed between the two filter elements for purposes of preventing buckling. In both patents the filter layers contain thermoplastic materials which are secured relative to the support frame elements by heat sealing the filter layers to each other.

Attempts have been made to eliminate the problems inherent in prior art filters. One answer to such device is described in U.S. Pat. No. 3,877,909 and includes a composite frameless filter having at least two fluid permeable filter members of substantially the same peripheral shape. A thin wire-like frame member is positioned between the filter members and is spaced inwardly from the periphery thereof. The first filter member constituting the upstream filter layer is relatively thick and comprised of a low density, medium to long filament puffed glass fiber layer while the second layer is positioned on the downstream side and is a thin, relatively high density non-woven fiber layer. Anti-bulge means are provided in this internally supported composite frameless filter which operates together with localized compression means centrally positioned on both sides of the composite filter to prevent the filter from bulging. Each of the filter members is adhesively secured to the frame member and is uncompacted throughout each of their entire thickness except in the area of the anti-bulge means.

While this filter works well in air-conditioning and heating devices, it has become desirable to provide an alternate means for solving the problems inherent in prior art filters and at the same time provide a more economic filter while retaining the advantages of the filter described in U.S. Pat. No. 3,877,909.

SUMMARY

The self-supporting, self-gasketing, multi-stage, variable density fiber glass sleeve filter of the invention has a generally rectangular configuration and includes the following:

a. a rigid, rectangular, internal reusable wire frame;

b. a composite, low velocity, fluid entry filter member on one side of said frame having a first fluid permeable, puffed glass fiber filter layer and a second fluid permeable, puffed glass fiber filter layer contiguous with said first filter layer and downstream thereof;

c. said first fluid permeable filter layer defining the fluid entry surface of the filter and having a thickness and density less than the thickness and density of said second fluid permeable filter layer;

d. a fluid egress member disposed on the other side of said frame comprising a flat, fibrous surfacing mat having a thickness less than the thickness of either of the layers of said entry filter member;

e. said entry filter member and said egress filter member each extending transversely beyond the longitudinal edges of said frame and being joined to one another by stitching exteriorly of said frame along longitudinal edge portions on opposed sides thereof so as to form an open ended sleeve that can be slid on and off of said reusable frame; and f. said sleeve being dimensioned such that when it is slid onto said frame, the fluid entry layer is tensioned across said wire frame and assumes an outwardly curved configuration with respect to said fluid egress member, said fluid egress member lying flat and being tensioned across said frame.

Preferably the filaments of the non-woven puffed glass layers are predominantly oriented in the same general direction. The layers themselves are oriented such that the filaments of each layer lie across or transverse to the frame and the sleeve. This provides for added strength for the filter which is uncompacted and completely unobstructed throughout the entire effective filtering area, that is the area within the frame.

DESCRIPTION

According to the present invention, a safer air filter is provided in that it is free from sharp, bottle cap scrap metal grill facings or the like which tend to lacerate the fingers of installers. Moreover, by being essentially frameless in that there is no frame extending around the periphery of the filter there is no need for paperboard framing or the like which can be crushed during storage or transit or can otherwise degrade due to contact with moisture. The filter of the invention is essentially a sleeve filter with a reusable metal frame. To change filters, the used sleeve is simply slid off of the frame and replaced with a new sleeve. Because the sleeve is made of puffed fiber glass, it is completely resilient and can be compressed to a minimum of ¼ of its normal volume. This means that replacement sleeves can be provided in compressed rolls and cut to size on the spot.

The filter of the present invention outperforms conventional panel type air filters by providing a greater air flow, higher efficiency and greater dust holding capacity. These improved properties are combined to clean the air more effectively and to reduce energy input.

Improved efficiency is the result of a two-stage variable density fiber glass filter member which is upstream of an internal wire frame which is provided with two distinct fluid permeable filters. The first fluid permeable layer is a medium to long filament puffed glass filber layer. The puffed glass layer can be impregnated with an oil or oleophilic agent to impart additional dust adhering properties to the fiber layer. This glass layer is less thin than the thickness of the second fluid permeable filter layer contiguous therewith and has a density less than the density of the second fluid permeable filter layer.

The second fluid permeable filter layer is also a medium to long filament puffed glass filter layer. The second puffed glass layer has a substantially greater thickness than the first layer and also has a greater fiber density. The first fiber layer is preferably color coded, (typically blue) to designate the correct air flow direction. By use of this outer glass fiber layer of thickness and density less than the juxtaposed inner layer, large particles entrained in the air will not load on the surface clogging the filter and preventing effective filtering of air subsequently encountering the filter. Rather, these particles will enter the filter and become entrapped by the subsequent filter layer of greater thickness. The greater density of the second fiber layer provides a "funnel-like filament construction" which assures final particle entrapment and greater depth for a greater filling capacity.

Preferably disposed behind this second fluid permeable filter layer is a further layer of medium to fine fibers commercially described as air strainer surfacing m4edium. The use of such a layer increases efficiency of filtering, serves as a gasket seal between the internal wire frame and filter cell framing, and also provides the down stream half of the sleeve structure.

The layers of the fluid entry filter layers are tensioned across the wire frame to assume an outwardly curved configuration and prevent bulging. These layers overlie the periphery of the wire frame and are stretched against the same. In the stretched condition they are secured to a fluid egress member on the downstream side of the wire frame of similar dimension which also overlies the wire frame. The fluid egress member is also tensioned across the wire frame and lies flat relative to the fluid entry member.

The sleeve filter can be compressed to such an extent that it can be wound up in the form of a continuous roll. In use, segments of the roll can be cut at desired intervals and force fitted about the internal wire frame. When fitted on the frame there is left on the exterior of the frame filter material which functions as a gasket to entrap those particles entrained in the air which might otherwise go untrapped in the case of a typical framed air filter unit where by-pass is possible.

The filter is effective over its entire surface area as compared to conventional panel filters. Greater resulting air flow reduces resistance while simultaneously increasing efficiency.

The sturdy internal wire frame, preferably made of steel, is sized to properly conform to face dimensions of standard filter cells. Since the frame support is internal, the extension of filter media beyond the wire frame seals the peripheral edges, eliminating unfiltered leakage problems inherent in the box-type air filters.

Storage of the filters is a relatively easy matter. With no box-like framing which requires protection, the air filter with frame can readily be compressed into shipping cartons of substantially reduced height or rolled into compressed rolls of sleeve filters for on-the-job assembly or replacement of used filter sleeves. Storage and transportation thus requires less space. The space saving ranges from between 25% for a filter of nominal thickness of one inch to about 60% for a filter of nominal thickness of two inches. The puffed glass filter layers return to their uncompressed state when removed from the shipping carton or unrolled.

The puffed glass layers of the fluid entry member resist the compressing effect of an air stream. This springy pattern of fibers extends the useful filter life since the underlying fibers do not mat into a "wall-like block" with the superimposed fibers.

The use of a denser second fluid permeable puffed glass filter layer serves as dimensional reinforcing for fine particle retention.

DESCRIPTION OF THE DRAWING

The present invention will be more readily understood with reference to the drawing wherein:

FIG. 1 is an isometric view of an air filter according to the invention in which the upstream side of the filter is shown;

FIG. 2 is a view similar to FIG. 1 showing the insertion of a wire frame;

FIGS. 3a and b are rear views of the filter of the invention showing the egress side; and FIG. 4 is an isometric view of a continuous roll of the filter sleeve used to form the filter of FIG. 1.

DESCRIPTION

Referring to the drawing herein there is provided a self-supporting, self-gasketing, multi-stage variable density fiber glass sleeve filter comprising a fluid entry member 2 which itself is made of several different layers. The first or outermost layer 4 is on the upstream side of the filter and forms the fluid entry surface of the filter. Layer 4 has a thickness and density less than the contiguous second fluid permeable layer 6. The layers 4 and 6 are stitched along longitudinal edges (at 14) to a flat egress member 12 to form a sleeve (FIG. 1). FIG. 2 shows a wire frame 10 being inserted into the sleeve of FIG. 1. FIG. 3 shows the disposition of the frame 10. It will be noted that a portion of the layers of 4, 6 and 12 extend beyond the longitudinal sides of the wire frame.

The sleeve filter can be shipped in custom made length sections or it can be wound up in a continuous roll as shown in FIG. 4. In either form the layers 4 and 6 are compressed to conserve shipping volume. When unrolled the filter sleeve assumes the form shown at 16 in FIG. 4. The sleeve can be severed according to the desired shape by cutting along line 20 (FIG. 4). Thereafter the wire frame 10 is inserted as shown in FIG. 2. When the filter has been fully saturated with dirt or dust or the like the frame 10 is removed for reuse. A further segment of sleeve filter is cut off of the roll of FIG. 4 and the same frame 10 is inserted therein.

When inserting the frame 10 within the sleeve, marginal portions 22 and 24 on the opposed long sides are provided. Similarly, marginal potions 26 and 28 can be provided on the remaining two sides to provide for maximum self-gasketing and the retention of particles of dust and dirt. If high velocity air flow or inaccessibility of filter holding chamber warrants, the narrow or open width of the sleeve may be closed as by sewing or clamping. In these problem systems, it may also be desirable to extend the length of the open end of the sleeve up to 3 inches beyond the wire framing. This will permit folding over in the filter chamber for pressure lock sealing by the high velocity air stream.

Normally, the filter layers of the fluid entry filter member wil be made of spun glass fibers. Additionally, the fluid egress layer can be made of spun glass fibers. Alternatively, this layer can be made from other fibers especially thermoplastic fibers notably nylon and polyester fibers.

The filter of this invention can be used in a variety of thicknesses and these thicknesses can employ the same internal wire frame. One can vary the thickness of the air filter on the wire frame in accordance with the extent to which the air is contaminated with dust and dirt. The air filters are particularly useful in unit ventilators for motels, hotels and other multiroom institutions like schools, office buildings, and hospitals whose singular zone climate and filtering control is important, which require constant use and in which there is a frequent need for replacement of the air filter material.

Most unit ventilators are long and slim in design with prominent locations under outside wall windows. The length and width of the filters required to fit the enumerable makes and models has created serious supply and availability problems in custom making of special size air filters. This invention eliminates perpetual reordering of custom size filters from the factory with long delays during seasonal change-overs. Instead, this invention provides a one time fabricated and reusable wire frame. The sleeve filter can be stocked in rolled flat tubular form in a number of standard popular widths ranging from 7 inches to 12 inches for prompt one-cutting to desired length.

This invention further provides an initial internal wire frame for later slide coupling with similar width wires to extend the length to a particular filter chamber. For example, two or more stock 8 inches × 30 inches wire frames will satisfy any 8 inch wide filter requirements varying in lengths between 30 inches and 60 inches as by slide coupling. This is shown in FIG. 3b where frames 10 and 10' slide in overlapping relationship to suit the desired filter sleeve length.

If desired, the frames 10 and 10' can be held together using a suitable clip device such as rings 11 in FIG. 3b. The clips can allow the frames to slide so as to accommodate the desired filter sleeve width or they can securely fasten the frames together before insertion into a filter sleeve.

The sleeve filter of the invention is supported solely by the internal frame. Because the entry and egress members are stitched together in the form of a sleeve which is tensioned across or transversely on the frame bulging and blow-out is effectively prevented without having to use cross members on the frame or an antibulge member which locally compresses the filter members. Thus, the area within the frame 10 is completely unobstructed and 100% of the filter surface and volume within the frame is available for filtering. This is only changed to a very small degree when slide coupling as shown in FIG. 3b is employed in which case the filter surface within the frame is reduced by the area of one or two wire frame ends depending on whether or not the ends overlap (FIG. 3b) are side by side or on top of one another.

What is claimed is:

1. A self-supporting, self-gasketing, multi-stage, variable density fiber glass sleeve filter of rectangular configuration comprising:
    a. a rigid, rectangular, internal reusable wire frame;
    b. a composite, low velocity, fluid entry filter member on one side of said frame having a first fluid permeable, puffed glass fiber outer filter layer and a second fluid permeable, puffed glass fiber inner filter layer contiguous with said first filter layer and positioned inwardly thereof;
    c. said first fluid permeable filter layer defining the fluid entry surface of the filter and having a thickness and density less than the thickness and density of said second fluid permeable filter layer;
    d. a fluid egress member disposed on the other side of said frame comprising a flat, fibrous surfacing mat having a thickness less than the thickness of either of the layers of said entry filter;
    e. said entry filter member and said egress filter member each extending transversely beyond the longitudinal edges of said frame and being joined to one another by stitching exteriorly of said frame along longitudinal edge portions on opposed sides thereof so as to form an open ended sleeve that can be slid on and off of said reusable frame; and
    f. said sleeve being dimensional such that when it is slid onto said frame, the fluid entry layer is tensioned across said wire frame and assumes an outwardly curved configuration with respect to said fluid egress member, said fluid egress member lying flat and tensioned across said frame.

2. Filter of claim 1 wherein said egress member is a fibrous polyester mat.

3. Filter of claim 1 wherein said fluid egress member is a fibrous nylon mat.

4. Filter of claim 1 wherein said fluid egress member is a surfacing mat of fine glass fibers.

5. Filter of claim 1 wherein the first filter layer of the fluid entry filter is color coded to designate the fluid entry side of the filter.

6. Filter of claim 1 wherein the layers of the entry filter member are made of non-woven medium or long spun glass filaments.

7. Filter of claim 1 wherein the filaments of the layers of the entry filter member are predominantly oriented in the same general direction and said layers are oriented such that said filaments of each layer are transverse to said frame and said sleeve.

8. Filter of claim 1 wherein the composite entry filter member and the egress member are uncompacted and completely unobstructed throughout the entire filtering area within said frame.

9. Filter of claim 1 wherein two or more wire frames in slide coupling relationship are positioned within the sleeve to suit a given filter length.

* * * * *